Sept. 10, 1963 M. L. QUIN 3,103,156
AREA LIGHTING AND AIR EXCHANGE APPARATUS
Filed March 30, 1961 3 Sheets-Sheet 1
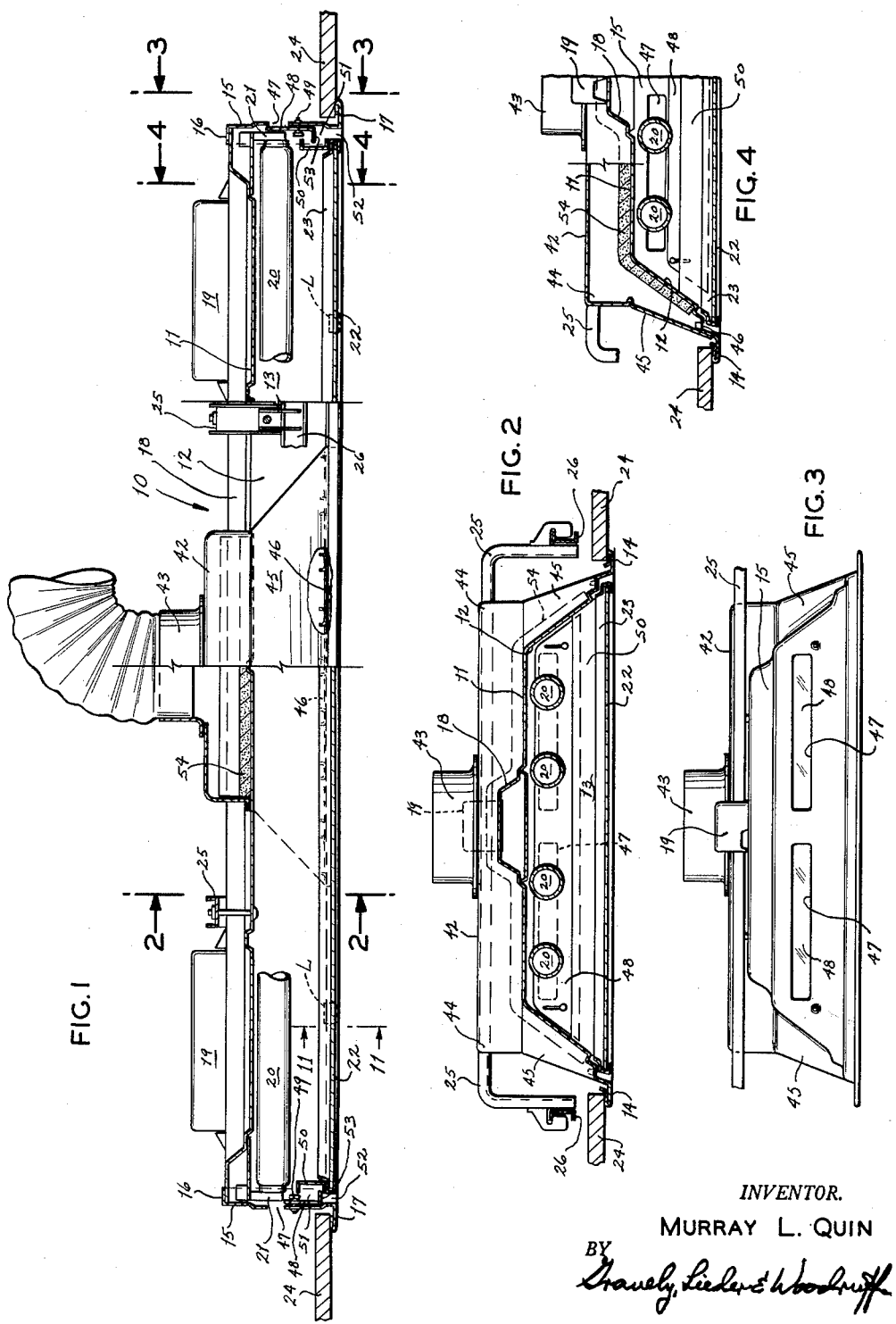
INVENTOR.
MURRAY L. QUIN
BY
ATTORNEYS

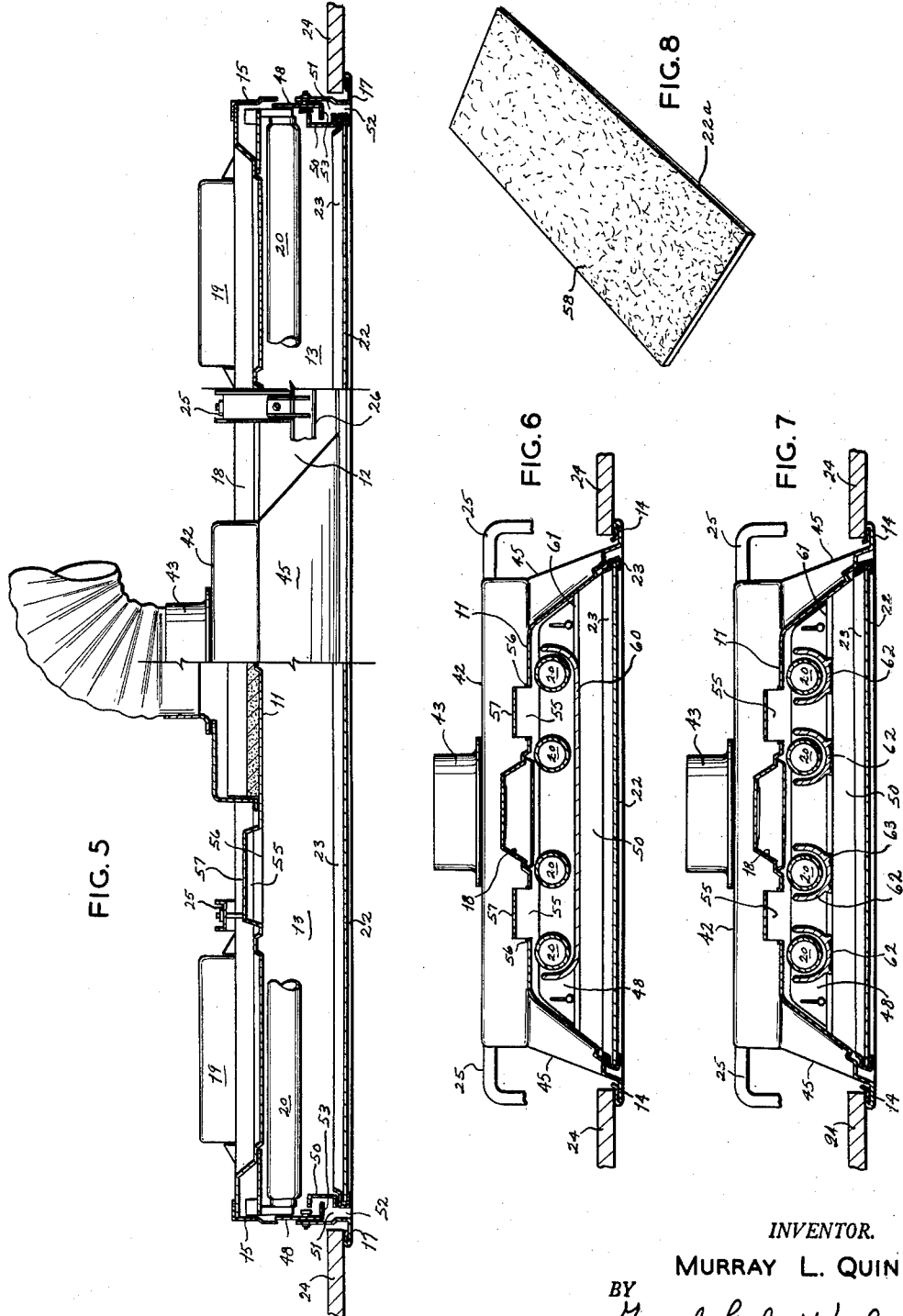

Sept. 10, 1963 M. L. QUIN 3,103,156
AREA LIGHTING AND AIR EXCHANGE APPARATUS
Filed March 30, 1961 3 Sheets-Sheet 3

INVENTOR.
MURRAY L. QUIN
BY
Gravely, Lieder & Woodruff
ATTORNEYS

United States Patent Office 3,103,156
Patented Sept. 10, 1963

3,103,156
AREA LIGHTING AND AIR EXCHANGE
APPARATUS
Murray L. Quin, Overland, Mo., assignor, by mesne assignments, to The Emerson Electric Manufacturing Company, St. Louis, Mo., a corporation of Missouri
Filed Mar. 30, 1961, Ser. No. 99,469
9 Claims. (Cl. 98—40)

This invention relates to apparatus for area or lighting space illumination and is particularly directed to apparatus having air exchange provisions communicating with the area or space lighted thereby.

It is known that areas or spaces in buildings can be illuminated and ventilated or supplied with conditioned air from apparatus which has the appearance of a common lighting fixture unit. It is also known that such units may be connected into an air moving system so that the air in the spaces may be exchanged with conditioned air. The problems with apparatus or lighting fixtures of the foregoing character is that the heat load from the illumination is not controlled in any way and uniform results when exchanging air in a given area or space with conditioned air have not been achieved. As illumination levels increase in any given space the resulting heat load imposes an economic problem of increasing the air conditioning load to off-set the heat load. Furthermore, the heat emitted by the illumination lamps has heretofore been substantially wasted because there has been no way to utilize it to advantage.

Additionally, the heat energy thrown off by illuminating lamps has imposed problems of control thereof since the energy in the form of heat comes from convection-conduction sources and from radiant sources. The first is normally handled by air movement, but the latter is independent of air movement and is only converted into sensible heat upon contact with occupants or objects in the space. The heat from both sources also has a profound effect upon lamp efficiency and upon the temperature of conditioned air flowing to the space through the fixture.

Because fluorescent lamps are extremely temperature-sensitive, a relationship exists between the amount of light generated, and the ambient temperature of their immediate surrounding. Lumen values for lamps are rated for operation in a still air 77° F. ambient. This is the condition under which the ratio of watts input to bulb area is designed to produce the bulb-wall temperature and internal mercury vapor pressure for the efficient emission of light from phosphors. Lamps rarely enjoy these optimum conditions within recessed troffers because of restricted convection currents for cooling, heat gain from ballasts and from adjacent lamps, and often from the heat buildup in unvented ceiling cavities.

Combinations of these adverse influences, generally regarded as normal, will increase bulb-wall temperatures considerably beyond the 100 to 110° F. design temperature, particularly in enclosed multi-lamp troffers. Internal factors controlling the conversion of energy into light are changed, resulting in an increase in thermal activity and a corresponding decrease in light output.

It is, therefore, an important object of this invention to provide apparatus in the form of lighting fixtures which will be useful in reducing the heat load or level in a given area or space and will easily permit the removal of heat caused by the lighting, such heat being collected in such a manner that it may be put to use elsewhere.

It is, furthermore, an important object of this invention to provide an improved lighting fixture which will permit recovery of substantial heat energy for use in space heating, or at least to supplement heating requirements for such space.

It is also an important object of this invention to provide a lighting fixture with space air exchange connections arranged so that air supply to the space and air exhaust from the space may be combined in the same fixture in a unique and novel manner.

A further important object of this invention is to provide means in a lighting fixture of the foregoing character for effectively controlling both sources of heat energy whereby lamp temperatures are maintained near optimum ranges for the conversion of energy into light.

A still further object of this invention is to provide a lighting fixture structure with means which will substantially reduce the influence of the lighting heat load upon the conditioned air supply and also reduce the radiant energy delivery to the space.

The foregoing objects and advantages for the present lighting fixture may be achieved in an improved manner by arranging the fixture components so that conditioned air for the illuminated space follows a path outside the lamp chamber, and the air exhausted from the space follows a path within the lamp chamber. In such a fixture the conditioned air is substantially removed from the influence of the lamp heat load, and the exhaust air flow substantially diminishes the convection transfer of heat, whereby light output is greatly improved. The improved fixture is admirably suited to the use of radiant energy reflective means and it is an object of this invention to provide such reflective means in a novel manner to achieve increased utility and substantially improved results.

Other objects and advantages will become apparent from an understanding of a presently preferred embodiment of this invention hereinafter disclosed in the details of its construction illustrated by the accompanying drawings, wherein:

FIG. 1 is a longitudinal elevational view of a lighting fixture embodying the principles of this invention, portions of the structure being shown in section;

FIG. 2 is a transverse sectional view of the fixture as seen at line 2—2 of FIG. 1;

FIG. 3 is an end elevational view of the fixture taken at line 3—3 in FIG. 1;

FIG. 4 is a further fragmentary transverse view partly in section and partly in full line of the fixture taken at line 4—4 in FIG. 1;

FIG. 5 is a view similar to FIG. 1 but illustrating a somewhat modified assembly;

FIG. 6 is a view similar to FIG. 2 but showing a modification of the fixture;

FIG. 7 is a still further modification of the fixture forming the subject of this invention;

FIG. 8 is a view of a lens with a coating of infrared radiation reflecting material;

Figure 11:
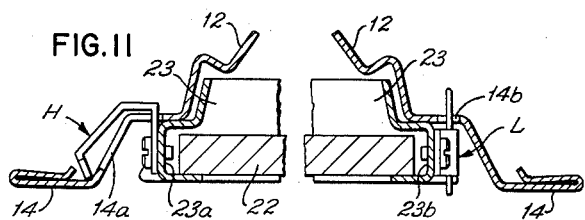

FIG. 11 is a greatly enlarged and fragmentary view of the fixture side flanges to show a typical hinge and latch arrangement by which the frame 23 for the closure lens 22 may be removably supported, the view being taken at line 11—11 in FIG. 1.

In the views of FIGS. 1 and 2, the fixture 10 comprises an elongated housing having an upper wall 11 and spaced side walls 12 angularly directed to provide a trough-shaped space 13 which opens downwardly between the longitudinal stepped flanges 14. The ends of the trough are closed by caps 15 which are formed substantially the same and are secured to the housing by flanges 16, and the lower margin of each cap is provided with a flange 17. A longitudinal wire-way channel 18 extends centrally along the upper wall 11 to receive the electrical wiring (not shown) and ballast units 19 for the fluorescent lamps 20. Sockets 21 at the opposite ends of the housing support the lamps in the usual manner. A fixture enclosing lens 22 is disposed in the open side of the housing and is provided with a frame 23 secured in any convenient manner with the stepped portions of the side flanges 14 and end cap flanges 17. The lens 22 encloses the space 13 but allows the light to enter the space below the fixture.

In a typical hinge and latch mounting as seen in FIG. 11 (the view being drawn with a large portion of the structure between the side flanges 14 being omitted) the frame 23 for the lens 22 has its left side indented at 23a to provide a vertical surface to receive the base plate of a hinge device H. The hinge fits through a suitable slot 14a in the flange 14. At the right side a spring latch L is mounted on the vertical surface 23b of the frame indentation. The latch L has a depending operating finger and an upwardly projecting catch element to releasably engage on the flange surface adjacent the usual slot 14b in the side flange. A plurality of the hinges H and latches L are usually used. Since these devices are not a part of the improvement hereof more detailed disclosure is not thought necessary.

A fixture of the foregoing character is mounted in a ceiling (FIG. 10) defined by the members 24. The fixture 10 is carried upon a suitable yoke-type suspension means 25 mounted in the usual manner from light channel beams 26 carried by the building or other structure. Any support means may be used as this is not a part of this invention.

Figure 9:
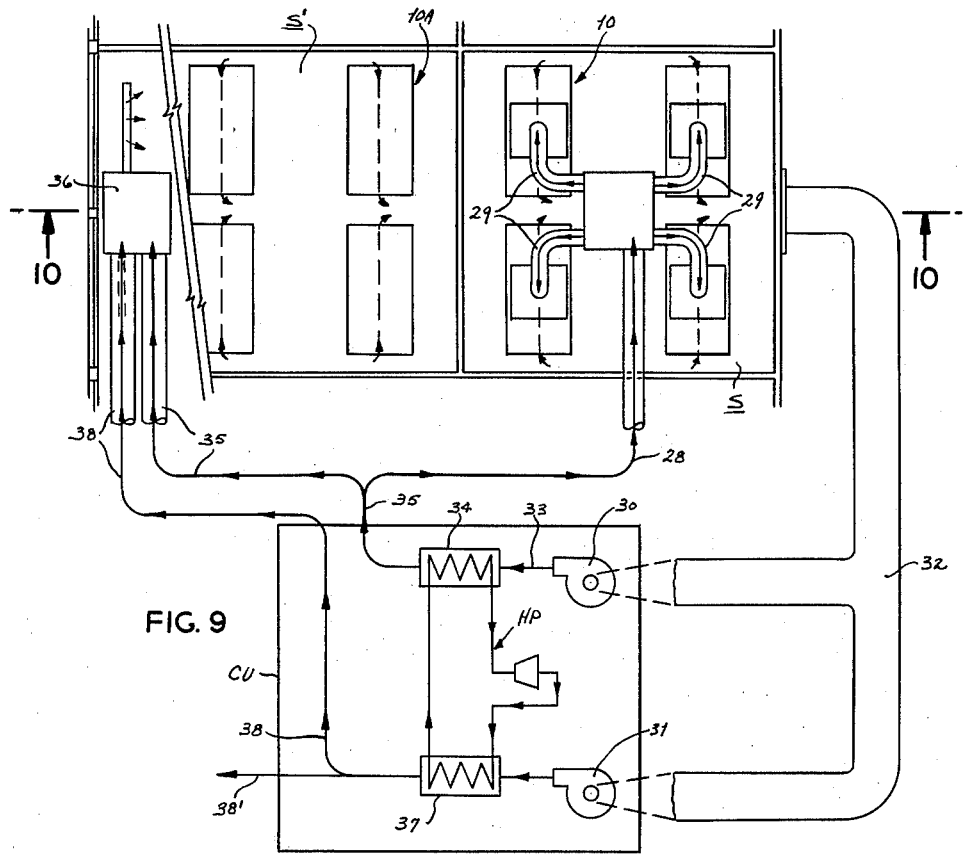
FIG. 9 is a plan view in diagrammatic layout of a building showing areas subject to lighting heat and also showing a lighting and air exchange system therefor.
Figure 10:
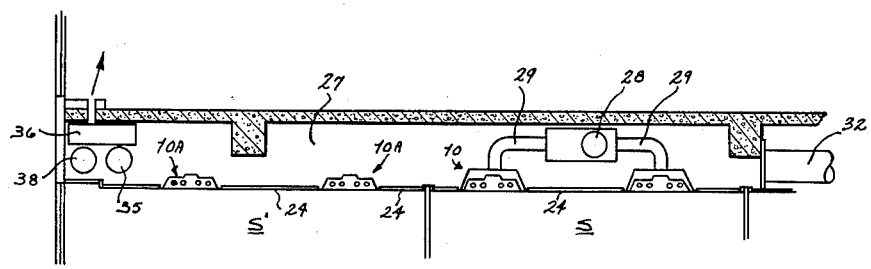
FIG. 10 is a sectional elevational view taken at line 10—10 in FIG. 9.

Referring now to FIGS. 9 and 10, it can be seen that the building space S has an interior area and an exterior area S' and that two rows of fixtures 10 and 10A are intermingled with ceiling members 24 and these separate a plenum space 27 from the areas which may be an office or the like. The fixtures 10 each act as an air and heat exchanger, that is conditioned air is supplied by conduits 28 from a conditioner unit CU to distribution manifolds 29 leading to the fixtures. The plenum space 27 is a chamber for room exhaust air and as such is given a negative pressure by either of two fans 30 and 31 connected to the plenum 27 by a conduit 32. The fan 30 has its discharge 33 connected to a cooler chamber 34 of a heat pump circuit HP, and the cooled air is conducted by one branch conduit 35 to a box 36 from which air can be introduced to the exterior area of space S'. The other branch associated with conduit 35 is in the conduit 28 above described. Fan 31 has its discharge connected to the heat dissipating condenser chamber 37 of the heat pump circuit HP, and the heated air is conducted by one conduit 38 to the box 36 for distribution. This system is designed for seasonal heating and cooling needs of the usable areas and has great flexibility. When the heat is not needed, the conduit 38 is closed and a conduit 38' is opened so that heat is dissipated.

In the views of FIGS. 9 and 10 the group of fixtures 10A which are similar to fixtures 10 except that the air supply provisions now to be described have been omitted. The fixtures 10A, therefore, are limited to air exchange flow out of the area being illuminated to carry off the heat to the plenum space 27.

Turning now to FIGS. 1 and 2, and with reference to FIGS. 9 and 10, the fixture 10 carries an air supply box 42 in its central span fed from an inlet 43 and such box extends laterally at 44 to connect with side boxes 45 which are suitably flared and direct air flow to the central span of stepped flanges 14 where apertures 46 are provided to direct air into the room area alongside the frame 23 for the lens 22. In FIG. 1 it can be seen that the side boxes 45 are about one-third the length of the fixture. This is not to suggest a limitation, but to indicate that a portion of the ends of the fixture should be blank so as not to develop a short circuit flow into the air exhaust flow now to be described.

In FIGS. 1, 3 and 4 it may be seen that the right end of the fixture 10 is provided with the end cap 15 and that the end cap 15 is formed with a plurality of apertures 47 which open between the fixture space 13 substantially opposite the elevation of the several lamps 20 and the plenum space 27. This cap carries a vertically adjustable damper 48 held by clamp screws 49. The left end of fixture 10 carries an end cap 15 also formed with a plurality of apertures 47 so that there is air exchange communication between the fixture space 13 and the plenum 27. The end cap 15 at the left end carries a similar damper 48 so that the caps 15 at each end are substantially the same. Adjacent the respective ends of the fixture are disposed crosswise or transversely extending channel elements 50 which are spaced from the end caps 15 to form a passage 51 which opens to the area S through an elongated gap 52 across the end face of the fixture. More specifically, each transverse element 50 forms wall means having the side flanges directed toward the respective ends 15, and the lower flange on each such wall provides a seat surface for the frame 23 of the closure panel 22 which frame stops short of the ends 15 to form the air inlet gap 52. It is also shown in FIGS. 1 and 5 that the dampers 48 have an angular lip 53 which cooperates with the transverse wall means 50 to open or close the passageway 51, as desired. As shown in FIGS. 2 and 4, each transverse wall means 50 has its ends abutting the side walls 12 of the fixture body and any desired means (such as welding) may be resorted to to secure the same.

It can be seen that the air supplied at inlet 43 from conduit 28 or other source is delivered to the space S centrally of the length of the fixture 10. In providing the air flow box 42, the laterals 44 and the side boxes 45 are covered by a blanket or layer of insulation 54 to separate the air from direct contact with the fixture wall 11 and wireway channel 18 and substantially reduce the exchange of heat to the air in the flow box 42. The air flows into the space S through the apertures 46. Concurrently the fan 30 or 31 may normally run to draw a negative pressure in the plenum space 27. The negative pressure is effective to induce an air flow at the inlet 52 at the right hand end of the fixture 10 (FIG. 1) and an air exhaust at apertures 47 in the left hand end cap 15, since the damper 48 is lowered to allow lip 53 to close the inlet 52. The air travels longitudinally through the fixture from right to left (this can be reversed by reversing the positions of dampers 48 from that shown in FIG. 1) and sweeps the lamps 20 to pick up heat and exhaust it outside the fixture, such as to the plenum space 27.

An alternate flow of air within the fixture is illustrated in FIG. 5, wherein the fixture parts similar to those seen in FIG. 1 are similarly numbered. The new part comprises forming an air outlet 55 in the top wall 11 intermediate the ends of the fixture so that air from the area of the room may be inducted at both ends 52 of the fixture. The outlet 55 is formed by longitudinally lancing the body at 56 in upper wall 11 of the fixture and displacing the web of material upwardly to form a bridge 57 open along the sides at the lancings 56. The bridge 57 substantially saves the reflective surface which would otherwise be lost if a hole were made.

The foregoing disclosure has included the application of a glass or plastic lens 22 in the fixture face opening to control the brightness characteristics of the lamps 20 and to hide them. Since radiant heat energy can produce sensible heat when it hits an absorbing object, it is desirable to reduce the radiant heat delivered to the room. This is handled (FIG. 8) by applying an infrared radiation reflecting layer 58 on the lens 22. This layer 58 is essentially transparent to visible light but reflects substantially all of the longwave infrared energy back into the space 13 within the fixture. Heretofore, the heat thus reflected and retained in the space 13 could not be dissipated easily and acted to reduce the light output efficiency of the lamps due to the rise in the temperature level at the lamps. The rise in temperature in this space also adversely affected the conditioned air. However, the present improvements of moving air between the usable area in a building and the plenum 27 has allowed a marked improvement in light output, efficient air exchange for a space and improvement in the overall efficiency in heating and cooling such area. A lens 22a is shown in FIG. 8 provided with a layer of coating material 58, and the lens is understood to be substituted, when desired, for the lens 22 of FIGS. 1 and 2.

An alternate application of the use of infrared radiation reflectors is seen in FIGS. 6 and 7. In FIG. 6, a single trough-shaped secondary lens 60 is supported at its ends on the upper edge of the crosswise channel elements 50 adjacent the end caps 15 of the fixture. The elements 50 may have a marginal lip 61 which is secured on the innermost vertical face thereof, and when so provided each lip 61 acts as a retainer for the trough lens 60 and locates the trough with its open ends in line with the air flow apertures in wall 15 so that air movement can be directed into the trough to sweep the heat out of the trough and into the plenum 27. Each lip 61 on the transverse channel means 50 is low enough so that the trough 60 may be angularly inserted with one end lifted first to clear the lip 61 at such end so that the trough may then be moved longitudinally toward the end 15. This longitudinal movement allows the opposite end to clear the other channel means 50 whereby the end may be brought up to the top, and then the trough is able to be moved longitudinally so that each end rests upon the channels 50 between the lips 60. Removal of the trough is accomplished by reversing the procedure above described.

In FIG. 7, each lamp 20 is provided with its own infrared radiation reflector 62. Each reflector 62 is inserted, removed and held in place as described above. To prevent the reflectors 62 from tipping or rolling, projections 63 are formed thereon.

As previously stated, energy consumed by the lighting system is dissipated by processes of convection, conduction and radiation. Of the wattage consumed by a fluorescent lamp, slightly less than one-half is emitted as radiant energy having a 2 to 1 ratio of invisible short-wave infrared to visible light energy. Since only 18% of the total input wattage is converted into light, the actual distribution of absolute energy, both light and heat, becomes an important factor of consideration in heat transfer studies. This should be true in any system analysis, whether visual or thermal, because of its ultimate effect on the space to be conditioned.

It is obvious from the temperature-sensitivity characteristics of fluorescent lamps that a relationship exists between the lighting efficiency and the heating ability of lighting equipment. Lighting efficiency is an inverse measure of the amount of light absorbed within the fixture. Since short-wave infrared energy follows the path of light, this too is absorbed and re-radiated along with convection-conduction heat to the room surfaces and, in the case of recessed troffers, into the ceiling cavity. Uncontrolled heat buildup within the troffer can only result in a greater proportion of the power consumed being converted into heat rather than light energy.

In terms of relative light output, performance of the air exchanger yields an equally important dividend. The effect of uncontrolled heat buildup within a troffer and resulting losses in the light producing potential of fluorescent lamps has been described. Through heat removal, the lamp compartment of the exchanger is cooled and bulb-wall temperatures are maintained at near optimum for maximum light output. By comparison with static conditions, air exchanger units can produce at least 15% more light than recessed fixtures without the novel provisions herein provided.

The air exchanger introduces for the first time a capability of removing a heretofore untouched segment of the lighting heat load—invisible infrared radiation. The heat-reflecting filter is produced by applying an optical interference coating 58 (FIG. 8) to the prismatic panel by vacuum deposition. The coating is essentially transparent to visible light but reflects almost all of the long-wave infrared energy back into the exchanger where it is absorbed and picked up by the return air stream. The same coating is applied to the troughs 60 and 62 (FIGS. 6 and 7). In combining heat transfer apparatus to handle thermal convection and thermal radiation an exchanger can transfer the equivalent of as much as 60% of the total lamp wattage into a low velocity (20 c.f.m.) return air stream. Discounting that portion of consumed energy which is emitted as visible light, the product would be 70% of the total lamp wattage available in the form of generated heat.

This invention is intended to cover all changes and modifications of the example of the invention herein chosen for purposes of the disclosure, which do not constitute departures from the spirit and scope of the invention.

What is claimed is:

1. Area lighting and ventilating apparatus comprising a body having walls enclosing the sides, top and ends, said body being open opposite said top and between said sides and ends, illuminating lamp means mounted in said body inwardly of said opening, light transmitting panel means mounted on said body over said opening and cooperating with said sides, top and ends to form a space enclosing said lamp means, ventilating air box means carried by said body between said ends and having portions extending over said top wall and downwardly adjacent said side walls, said side walls having marginal flanges adjacent said panel means formed with apertures opening therethrough outside of said lamp enclosing body space, said downward extending portions of the air box means engaging said marginal flanges over said apertures, insulating means in said air box means over the adjacent surfaces of said body top and side walls to reduce heat exchange between ventilating air flow in said air box means and the interior of said body, air inlet means on said air box means to admit ventilating air thereto for flow to and through said flange apertures for the area to be lighted and ventilated, wall means in said body spaced from one of said body end walls and cooperating with the latter to form an opening communicating between the enclosing lamp space and the area to be lighted and ventilated, and said body having air outlet means spaced from said first mentioned opening providing an opening between the enclosing lamp space and the exterior of said body remote from the area to be lighted and ventilated, whereby air movement is a flow between said first mentioned opening to the area to be ventilated and said air outlet means to exhaust the heat generated by said lamp means out of the enclosed lamp space with air flow from the area.

2. The apparatus set forth in claim 1 wherein said air outlet means is provided in said body top wall and comprises at least one wall portion off-set from said top wall to form an opening, said off-set wall portion and said top and side walls of said body having light reflective surfaces to direct the light from said lighting means toward said light transmitting panel means.

3. The apparatus set forth in claim 1 wherein second wall means is in said body spaced from said other one of said body end walls and cooperated with the latter end wall to form an opening communicating between the enclosing lamp space and the area to be lighted and ventilated, and said air outlet means comprises at least one wall portion off-set from said top wall to form an opening between said enclosing lamp space and the exterior of said body remote from the area to be lighted and ventilated, whereby air movement from such area flows through both of said end wall openings and out through said air outlet means.

4. The apparatus set forth in claim 1 wherein an infrared radiation reflecting layer is provided on said light transmitting panel adjacent said lamp means, said layer being essentially transparent to visible light and reflective of substantially all the longwave infrared radiation.

5. The apparatus set forth in claim 1 wherein a second panel means is mounted in said body adjacent said illuminating lamp means, said second panel providing an air flow channel in said enclosing lamp space, and an infrared radiation reflecting layer on one of said panel means essentially transparent to visible light and reflective of substantially all the longwave infrared radiation.

6. The apparatus set forth in claim 8 which also includes a coating of reflecting material on the surface of said closure means adjacent said illuminating lamp means, said coating material reflecting the heat energy of asid illuminating lamp means for exhaust with the lamp heated air.

7. The apparatus set forth in claim 8 which also includes light pervious means mounted between said illuminating lamp means and said closure means, said light pervious means being open at its opposite ends to receive exhaust room air flow to said fixture body for exhaust at said opposite transverse wall.

8. Apparatus for illuminating and ventilating a room through a lighting fixture disposed in a room ceiling with a face in the room and other portions exterior to the room, the apparatus including: a lighting fixture body having opposite sides and ends disposed in rectangular plan form and having an open side facing the room; illuminating lamp means in said body; closure means disposed in the open side of said body; flanges on said body defining the side and end margins of the open side and serving to locate said body relative to the room ceiling surface; room ventilating air supply means located exteriorly to the room and including a casing mounted on said fixture body in abutment with portions of certain of said body side flanges, said side flanges within the portions abutted by said casing having openings to the room to admit ventilating air thereto; and apertured means to exhaust room air through said fixture body adjacent said lamp means and to the exterior, including at least one transverse wall means carried by said fixture body spaced from one of said body ends to define with said latter body end a passage between the room and the body interior, the body having an air exhaust opening between the body interior and the exterior spaced from said one transverse wall means, and a movable damper means carried by said one body end in position cooperating with said transverse wall means and selectively positionable to control the passage so as to admit room air at said one transverse wall means and establish flow of exhaust lamp heated room air at said body air exhaust opening.

9. Apparatus for illuminating and ventilating a room through a lighting fixture disposed in a room ceiling with a face in the room and other portions exterior to the room, the apparatus including: a lighting fixture body having opposite sides and ends disposed in rectangular plan form and having an open side facing the room; illuminating lamp means in said body; closure means disposed in the open side of said body; flanges on said body defining the side and end margins of the open side and serving to locate said body relative to the room ceiling surface; room ventilating air supply means located exteriorly to the room and including a casing mounted on said fixture body in abutment with portions of certain of said body side flanges, said side flanges within the portions abutted by said casing having openings to the room to admit ventilating air thereto; and apertured means to exhaust room air through said fixture body adjacent said lamp means and to the exterior, including transverse wall means carried by said fixture body adjacent each end of said body and spaced from said body ends to define with said latter body ends passages opening between the room and the body interior, the body having an air exhaust opening between the body interior and the exterior and spaced from said transverse wall means, and movable damper means carried by said body ends in positions cooperating with said transverse wall means and selectively positionable to control the passages so as to admit room air at said transverse wall means and establish flow of exhaust lamp heated room air at said body air exhaust opening.

References Cited in the file of this patent

UNITED STATES PATENTS

| | | |
|---|---|---|
| 2,189,008 | Kurt | Feb. 6, 1940 |
| 2,255,849 | Kurt | Sept. 16, 1941 |
| 2,433,982 | Clarkson et al. | Jan. 6, 1948 |
| 2,827,554 | Gunther et al. | Mar. 18, 1958 |
| 2,845,855 | Burns | Oct. 5, 1958 |
| 2,956,150 | Schwartz | Oct. 11, 1960 |
| 2,991,708 | Falk | July 11, 1961 |
| 3,010,378 | Geocaris | Nov. 28, 1961 |
| 3,065,686 | Geocaris | Nov. 27, 1962 |